US005652606A

United States Patent [19]
Sasaki et al.

[11] Patent Number: 5,652,606
[45] Date of Patent: *Jul. 29, 1997

[54] MESSAGE CARD

[75] Inventors: Naotaka Sasaki; Shunichi Kawamata, both of Kiryu, Japan

[73] Assignee: Japan Servo Co., Ltd., Tokyo, Japan

[*] Notice: The term of this patent shall not extend beyond the expiration date of Pat. No. 5,502,463.

[21] Appl. No.: 535,466

[22] Filed: Sep. 28, 1995

Related U.S. Application Data

[62] Division of Ser. No. 76,148, Jun. 14, 1993, Pat. No. 5,502,463.

[30] Foreign Application Priority Data

Jul. 7, 1992 [JP] Japan .................. 4-201774

[51] Int. Cl.$^6$ .................................................. G09G 3/00
[52] U.S. Cl. .......................... 345/204; 345/901; 40/902
[58] Field of Search ................. 40/124, 124.1–124.5, 40/454, 463, 902, 906; 446/147; 395/113; 345/80, 901, 204, 101; 428/901; 348/838; 340/815.4

[56] References Cited

U.S. PATENT DOCUMENTS

| | | | |
|---|---|---|---|
| 4,159,417 | 6/1979 | Rubincam | 345/901 |
| 4,363,081 | 12/1982 | Wilbur | 40/124.1 |
| 4,639,225 | 1/1987 | Washizuka | 348/838 |
| 4,656,469 | 4/1987 | Oliver et al. | 345/101 |
| 4,694,347 | 9/1987 | Ito | 358/236 |
| 4,703,573 | 11/1987 | Montgomery et al. | 40/455 |
| 4,791,741 | 12/1988 | Kondo | 40/124.1 |
| 4,862,153 | 8/1989 | Nakatani et al. | 345/98 |
| 4,907,162 | 3/1990 | Fougere | 395/113 |
| 4,934,079 | 6/1990 | Hoshi | 40/463 |
| 5,063,698 | 11/1991 | Johnson et al. | 40/902 |

FOREIGN PATENT DOCUMENTS

| | | |
|---|---|---|
| 54-68116 | 1/1979 | Japan . |
| 2149544 | 6/1985 | United Kingdom . |
| 8701481 | 3/1987 | WIPO . |
| 8905023 | 6/1989 | WIPO . |

OTHER PUBLICATIONS

Intel Components Handbook, 1989, pp. 1–2.
IBM Technical Disclosure, "Touch Keyboard Using Liquid Crystal Material", vol. 18, No. 1, p. 231, Jun. 1975.
Murray, John M., "The Architecture of an Electronic Book", IEEE Transactions on Industrial Electronics, vol. IE–29, No. 1, Feb. 1982.

*Primary Examiner*—Richard Hjerpe
*Assistant Examiner*—Lun-Yi Lao

[57] ABSTRACT

A message card includes a button type dry battery, a visual image display, a speaker, a control circuit for recording, storing and reproducing both of visual images and audio messages data, a flexible circuit substrate for mounting the control circuit, connecting substrate formed integrally to the circuit substrate for connecting electrically the control circuit with the visual image display and with the speaker, writing terminals for writing desired visual images and audio messages data on the control circuit and being connected electrically to the control circuit on the substrate, and a switch for activating the reproduction of the visual images and the audio messages data.

15 Claims, 3 Drawing Sheets

MESSAGE CARD

This application is a divisional of application Ser. No. 08/076,148, filed on Jun. 14, 1993, now U.S. Pat. No. 5,502,463, issued Mar. 26, 1996 the entire contents of which are hereby incorporated by reference.

BACKGROUND OF THE INVENTION

1. Field of the Invention

This invention relates generally to a message card and, particularly, to a greeting card having thereon audio signal recording and reproducing function together with visual signal.

2. Description of the Prior Art

FIG. 8 shows an example of prior art audio message card. In the drawing, shown at numeral 16 is the message card, at 3 is a control circuit for controlling recording, storing and reproducing function of audio data, at 5 is a speaker at 6, are speaker connecting wires for connecting the speaker with the control circuit, at 8 is a dry battery acting as an electric source for driving the control circuit 3 and the speaker 5, at 17 is a substrate of the circuit 3, at 18 is a switch element for activating the reproduction of the audio signal, at 19 are connecting wires for electrically connecting the switch element 18 with the control circuit 3, at 20 is a writing terminal connected to the circuit substrate 17 for writing desired audio data into the control circuit 3, and at 21 is a audio signal generating unit.

In assembling the phonetic signal generating unit 21 into the phonetic message card 16, the control circuit 3 formed of for example epoxy resin is first mounted on the rigid substrate 17, then, the switch connecting wires 19, the speaker connecting wires 6 and the writing terminal 20 are electrically connected by for example soldering respectively, thereby the switch element 18 and the speaker 5 can be connected through the writing terminal 20 with outside recording and writing equipment (not shown). The dry battery 8 is connected to the control circuit 3 on the substrate 17 usually through pressing means not shown in the drawing.

The audio signal generating unit 21 being assembled as above described is incorporated in the audio message card 16 which has thereon various visual printed messages in accordance with the object of the merchandise and has been folded into a predetermined size, and a portion of the writing terminal 20 is exposed from an end surface of the sheet like message card 16. In writing the audio message, the exposed portion of the writing terminal 20 is connected to the outside recording and writing equipment, so that the audio message in the form of digital data of a predetermined format is stored and reserved as one time writable type ROM (referred hereinafter as OTPROM) which is provided in the control circuit 3. When the writing is completed, the exposed portion of the writing terminal 20 is cut off and is disposed of. The audio message is reproduced by pushing a switch position P on the surface of the card 16 so as to activate the switch element 18 which is provided just below the switch position P, thereby, the audio data reserved in the control circuit 3 is reproduced and, in the control circuit 3, the signal is converted in digital-analog conversion and is amplified to excite the speaker 5 so as to generate the audio signal.

In the prior art phonetic message card, the circuit substrate 17, the switch element 18 as activating means for reproducing the audio signal, switch connecting wires 19, the speaker connecting wires 6 and the writing terminal 20 are constituted of distinct parts so that it is required to apply electrical connecting process such as soldering. The process increases the cost by increasing the number of hours during the assembling process, and decreases the reliability in the connection. When the reliability in the connection decreases the operation of the speaker will sometimes be impaired, and the object of transmitting the message of the greeting card will not be achieved. Further, the prior art message card has both of visual and phonetic messages, but the visual message is limited to fixed messages printed or written on the surface of the message card.

An object of the present invention is to overcome above described deficiencies in prior art message card and to provide a message card wherein a reliably recording and reproduction desired audio message is achieved. According to a preferred embodiment of the invention, a new message card is provided reliably permits recording and reproduction both audio and visual messages.

SUMMARY OF THE INVENTION

According to the present invention, there is provided a message card of a folded sheet like card and incorporated therein, electric energy supplying means, visual image display means, audio message producing means, a control circuit for recording, storing and reproducing both of visual image and phonetic message, a circuit substrate for mounting the control circuit, connecting means for electrically connecting the control circuit on the substrate with the visual image display means, connecting means for electrically connecting the control circuit on the substrate with the audio message producing means, writing terminals for writing desired visual image data and audio message data on the control circuit and being connected electrically to the control circuit on the substrate, and activating means for activating the reproduction of the visual image data and the audio message data; whereby when the activating means is activated by pressing a predetermined location on the card, the recorded and stored visual image data and audio message data are reproduced such that the visual images are displayed and audio messages are generated.

The circuit substrate may be formed of a flexible substrate.

The activating means may be formed of a substrate which is integral to the circuit substrate.

The writing terminal may be formed of a substrate which is integral to the circuit substrate.

According to another feature of the present invention, there is provided a message card of a folded sheet like card and incorporated therein; a dry battery, a speaker, a control circuit for recording, storing and reproducing audio messages, a circuit substrate for mounting the control circuit, connecting means for electrically connecting the control circuit on the substrate with the speaker, writing terminals for writing desired audio message on the control circuit and being provided as a substrate which is integral to the first mentioned substrate and being connected electrically to the control circuit on the substrate, and activating means for activating the reproduction of the audio messages; whereby when the activating means is activated by pressing a predetermined location on the card, the recorded and stored audio messages are reproduced through the speaker.

The connecting means for electrically connecting the circuit network on the substrate with the visual image display means and/or the connecting means for electrically connecting the circuit network on the substrate with the audio message producing means may be formed of a substrate which is integral to the circuit substrate.

Thus, according to the present invention, it is possible to reproduce desired visual and audio messages being recorded previously, and, by utilizing the flexibility of the material of the substrate, to form at least the circuit substrate, activating means for reproducing the visual and audio messages, and writing terminals for recording the visual and audio messages as a single substrate and, further, to constitute connection means for connecting the control circuit substrate with the visual image display means and with the audio message producing means as an integral substrate.

The above and other features and advantages of the present invention and the manner of utilizing them will become more apparent, and the invention itself will best be understood, from the following description with reference to the attached drawings showing a preferred embodiment of the invention.

DESCRIPTION OF THE PREFERRED EMBODIMENT

Figure 1:
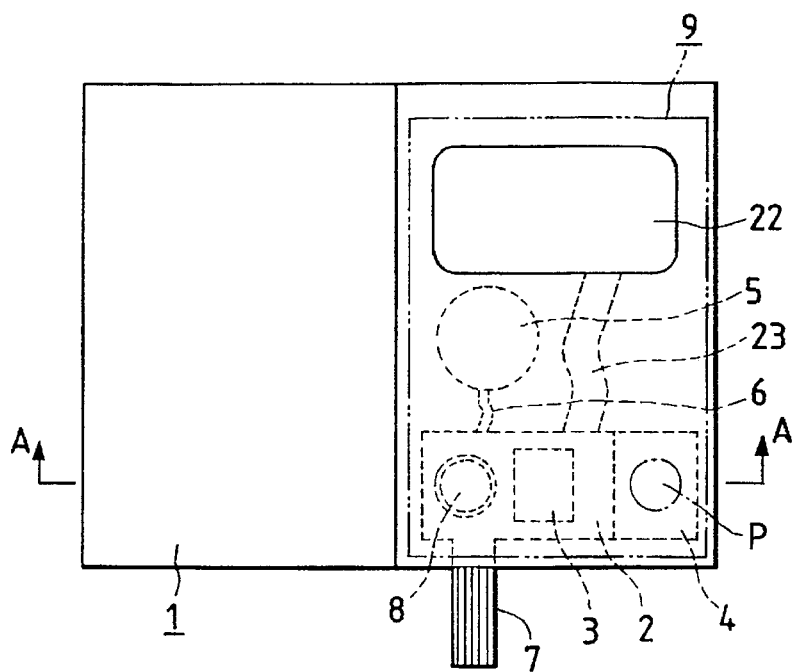
FIG. 1 is a schematic view of a greeting card according to an embodiment of the invention.

Referring to FIG. 1, shown at numeral 1 is a greeting card according to an embodiment of the present invention, at 2 is a flexible substrate constituting a circuit substrate, at 3 is a control circuit, at 4 is an activating switch for activating the reproduction of visual and audio messages, at 5 is a speaker acting as audio message reproducing means, at 6 are speaker connection wires as electrical connecting means of the speaker 5, at 7 is a writing terminal, at 8 is a dry battery as electric energy supply means, at 9 is a reproducing unit, at 22 is a liquid crystal display (referred hereinafter as LCD) as visual message display means, and at 23 are connection wires of LCD.

The flexible substrate 2 is formed of a polyester resin film or a polyimide resin film and, a predetermined circuit network is formed thereon by utilizing a copper foil. The control circuit 3 formed on the flexible substrate 2 comprises an electrically writable and erasable ROM (referred hereinafter as EEPROM) or an OTPROM of a storing circuit for storing desired visual and audible messages, a LCD drive circuit for converting the image data into visual image message data in reproducing the visual messages, a speech composite circuit to composite the speech in reproducing the audible messages, a D/A (digital-to-analog) converter for converting the audible messages into analog data, a low pass filter, an amplifier for amplifying the signal sufficient to actuate the speaker, and a system control circuit for controlling the signal processing. The visual message display means 22 is preferably formed of LCD for saving the electric power consumption, but, it is only required to display desired visual message and may be of any type compatible to the power supply. In the embodiment, the LCD is capable of displaying graphically with the size of the picture elements of 0.3 mm×0.3 mm or 0.5 mm×0.5 mm, and is connected to the visual image output portion in the control circuit 3 through LCD connection wires 23. To reduce the thickness, the speaker 5 is formed mainly of piezoelectric sounding member and, which is connected to audible massage output portion in the control circuit 3 through speaker connection wires 6.

Figure 5:
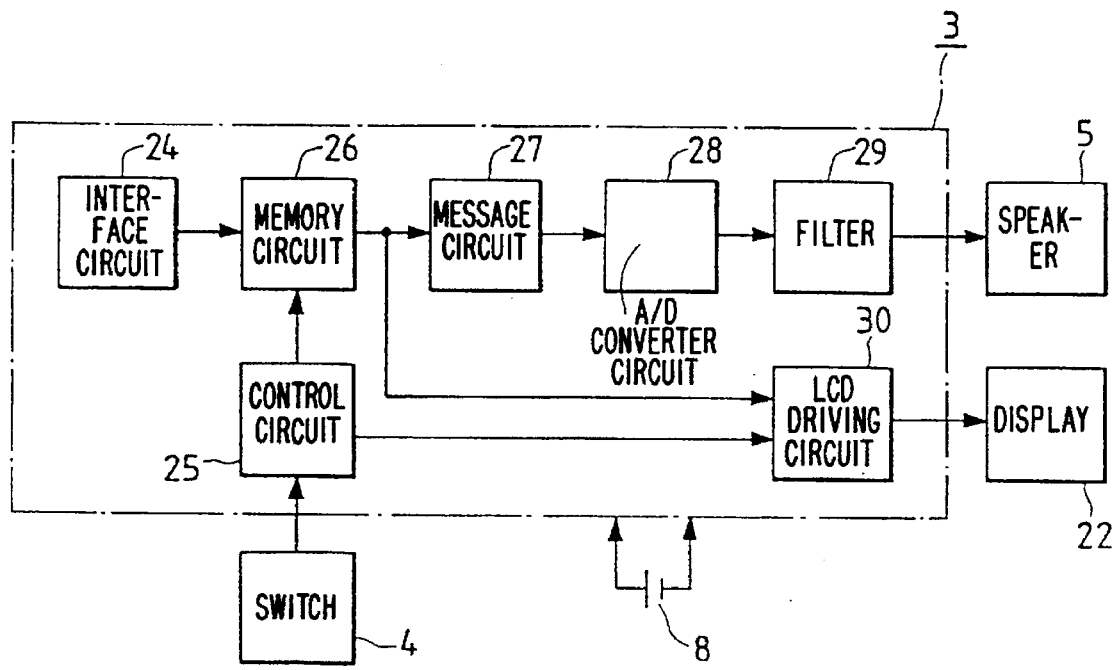
FIG. 5 is a block diagram of the control circuit of the greeting card according to the invention.

FIG. 5 shows the constitution of the control circuit 3. In the drawing, shown at numeral 24 is an interface circuit, at 25 is the system control circuit, at 26 is the memory circuit including OTPROM or EEPROM, at 27 is the audible message composite circuit, at 28 is the A/D converter circuit, at 29 is the filter and amplifying circuit and at 30 is the LCD driving circuit.

Visual and audible messages in the form of predetermined format are, through the writing terminal 7 (refer to FIG. 1), inputted into the interface circuit 24 from an outside writing mechanism (not shown), and the data is stored in the memory circuit 26 under the control of the control circuit 25. The reproduction of the stored visual and audible messages is initiated by actuating the activating switch 4 which is formed of a substrate being integral to the flexible substrate 2. The reproduction of the visual messages is performed such that a plural number of still pictures, the number of which is determined by the memory capacity allocated for the visual messages in the memory circuit 26, are graphically processed in the LCD drive circuit 30 and are displayed sequentially on the LCD 22 at a predetermined sampling cycle. The reproduction of the audible messages is performed, as determined by the memory capacity allocated for the audible messages in the memory circuit 26 and a predetermined duration defined by a sampling cycle, such that the data retrieved from the memory circuit 26 is converted into the reproduced audible messages in the audible message composite circuit 27, then, in the A/D conversion circuit 28, is converted into analog electric voltage and processed to remove the signal of unnecessary frequency band and to amplify the electric power of the reproduced signal, thereafter, the speaker 5 is excited to reproduce the audible messages. The dry battery 8 is usually a button type manganese dioxide lithium battery, and is connected to the circuit network on the flexible substrate 2 through a pressing device (not shown). The battery 8 acts as a power source for the control circuit 3 and the speaker 5 during a predetermined life time corresponding to the capacity. The dry battery may be substituted by a solar battery with a transparent window being provided in the card at the location above the light receiving portion of the solar battery, then, the battery can be used as semi-permanent electric power supply source.

These constituting elements are sub-assembled as a reproduction unit 9, and the unit 9 is incorporated in the greeting card 1 on which various printings have been applied in accordance with the object of the article of commerce and which has been folded into a predetermined size. A portion of the writing terminal 7 is exposed from an end surface of the greeting card 1. The writing of the visual and audible messages is effected by connecting the exposed portion of the writing terminal 7 with an outside recording and writing equipment, and when the writing is completed the exposed portion of the writing terminal 7 is cut off and discarded. However, when EEPROM is utilized in the memory circuit 26, the exposed portion of the writing terminal 7 may not be cut off such that the writing terminal 7 is maintained with the exposed portion being normally folded, then the greeting card can repeatedly be utilized with revised visual and audible messages being recorded and reproduced. In reproducing visual and audible messages a switch portion P in the surface of the card is pressed by a finger, then the activating switch 4 incorporated in the card and just below the switch portion P is activated and the reproduction of the visual and audible messages is started, which is performed for a predetermined time duration as described heretofore. When the activation of the switch 4 is repeated, then, the reproduction is repeated.

Figure 2:
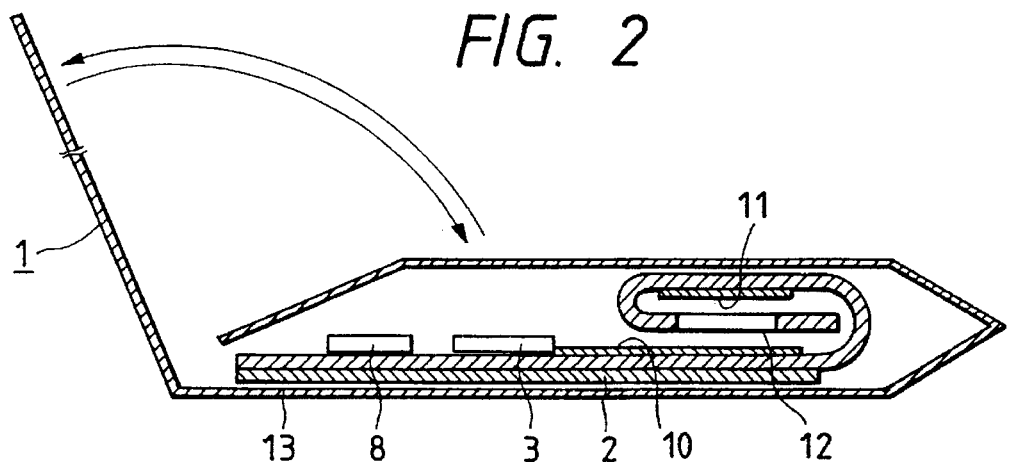
FIG. 2 is an enlarged sectional view taken along line A—A in FIG. 1.

FIG. 2 shows the construction of the activating switch 4. In the drawing, shown at numeral 10 is a switch electrode of the switch 4, at 11 is a contact electrode for contacting with the switch electrode 10, at 12 is a window provided in a predetermined location of the flexible substrate 2, and at 13 is a reinforcing plate secured to a a predetermined location of the flexible substrate 2.

A portion of the flexible substrate 2 having the window 12 and the contact electrode 11 is normally folded, as shown in FIG. 2, such that the portion having the window 12 is located between the portion having switch electrode 10 and the portion having the contact electrode 11, and the portion having the window 12 acts normally as a spacer preventing the contact of the switch electrode 10 and the contact electrode 11. When the switch portion P (FIG. 1) located just above the contact electrode 11 is depressed by a finger, a flexible substrate provided as a base of the contact electrode 11 is deflected such that the contact electrode 11 passes through the window 12 to contact with the switch electrode 10 thereby actuating the circuit. The reinforcing plate 13 is formed of a rigid material such as phenol resin and has a sufficient thickness so as to support the flexible substrate from the lower surface thereby supporting the force applied by the finger and assuring the contact between the switch electrode 10 and the contact electrode 11. The reinforcing plate 13 may be omitted when the greeting card 1 is formed of a sheet having sufficient rigidity. The reinforcing plate 13 may have the area covering the folded portion constituting the actuating switch 4.

Figure 3:
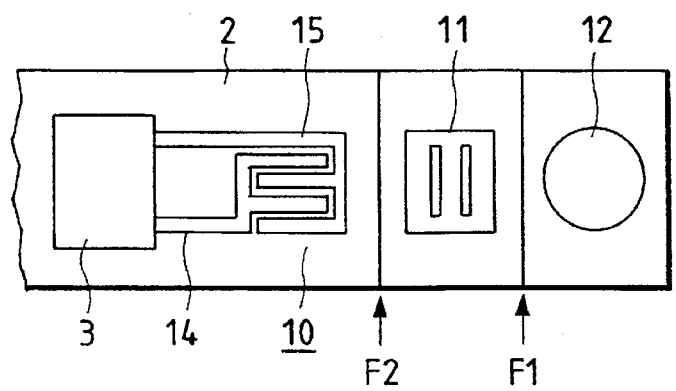
FIG. 3 is a partial development view of switch portion of the circuit substrate of FIG. 1

FIG. 3 is a plan view or exploded view showing the configuration of the switch electrode 10 and the contact electrode 11. In the drawing, shown at numeral 14 is a switch electrode a constituting the first electrode of the switch electrode 10, at 15 is a switch electrode b constituting the second electrode of the switch electrode 10, at F1 is the first folding line, and at F2 is the second folding line.

The switch a of the electrode 14 and the switch b of the electrode 15 are respectively formed to have comb plate type configurations which are spaced by small distance, and are connected to the control circuit 3. The contact electrode 11 is located nearly medium of the first and the second folding points F1 and F2, and the circular window 12 is located nearly medium of the first folding points F1 and an edge line of the flexible substrate 2. As shown in the sectional view of FIG. 2, by folding toward the surface of the paper of FIG. 3 along the first folding line F1 and folding again in the same direction along the second folding line F2, then, it is easy to form an electric switch having the switch electrode 10 and the contact electrode 11 opposing to each other with the spacer being interposed therebetween. When the finger pressure is applied on the rear side of the contact electrode 11, as described formerly, the flexible substrate acting as the base of the contact electrode 11 is deflected such that at least a portion of the contact electrode 11 passes through the window 12 to contact with the switch electrode 10 thereby the switch a of the electrode 14 and the switch b of the electrode 15 are connected to each other and the actuating signal is obtained. Incidentally, the first and the second folding operations are performed in the same directions, however, the plan view of the substrate 2 is not limited to the particular embodiment and the folding operation can be changed accordingly.

Figure 4:
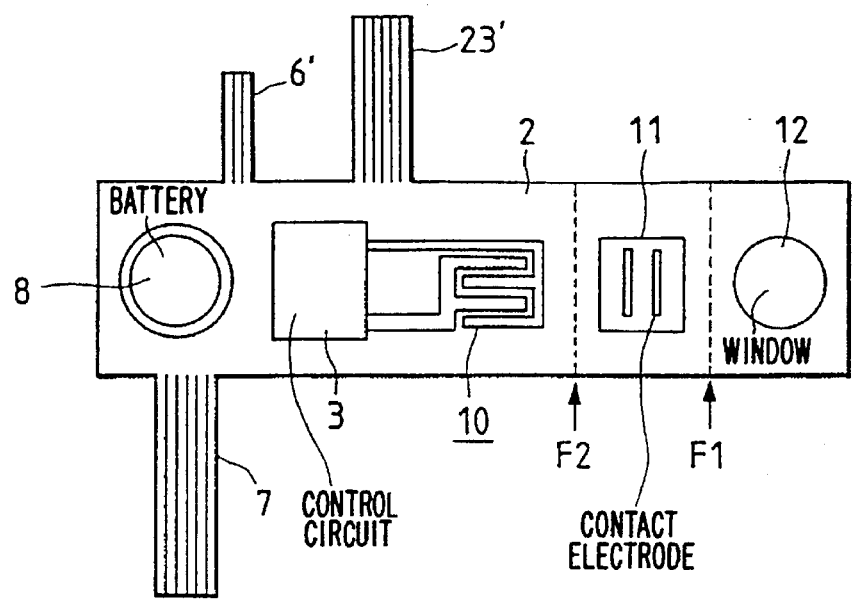
FIG. 4 is a development view of a circuit substrate according to modified embodiment of the invention.

FIG. 4 shows a modified embodiment, in which the number of parts of the reproduction unit 9 is reduced further by utilizing the character of the flexible substrate 2. In the drawing, shown at numeral 6' is a substrate integral to the substrate 2 and acting as the speaker connection wires 6 in the first embodiment, and at 23' is also a substrate integral to the substrate 2 and acting as LCD connection wires 23 in the first embodiment. The speaker connection wire 6' is required to be connected to a first and second terminals (not shown in the drawing) provided at predetermined location of the speaker 5, and the LCD connection wire 23' is required to have a plurality of connecting electrodes so as to control the picture elements, thus, for reducing the size and the thickness of the greeting card 1 and for improving the reliability of the card 1, it is preferred to form the connection wires as thin and flexible as possible, and to reduce the number of connecting portions to the minimum. According to the invention, as shown in FIG. 4, by utilizing the thin and flexible characteristics of the flexible substrate 2, the control circuit 3, the parts 10 and 11 relating the activating switch, writing terminal 7 and, further, the speaker connection wires 6' and the LCD connection wires 23' are formed as flexible substrates respectively which are integral to the substrate 2.

Figure 6:
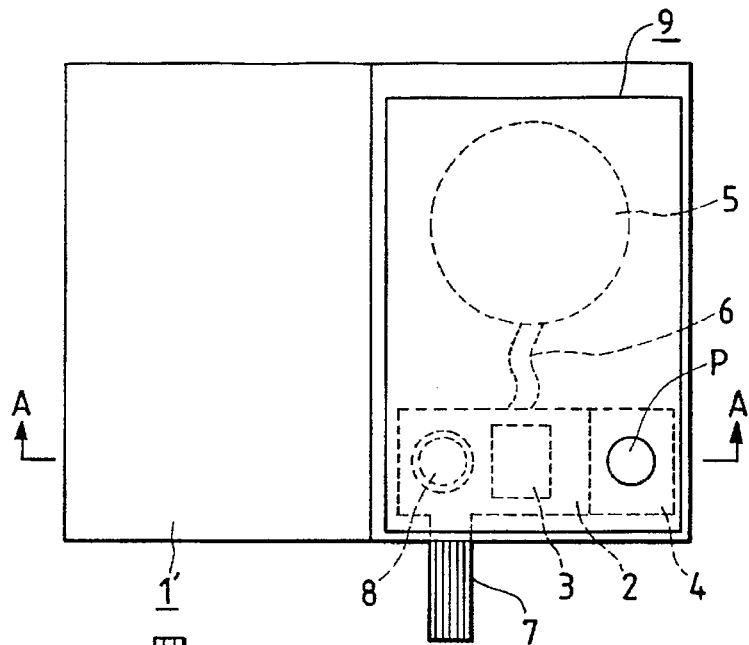
FIG. 6 is a schematic view of a greeting card according to a second embodiment of the invention.
Figure 7:
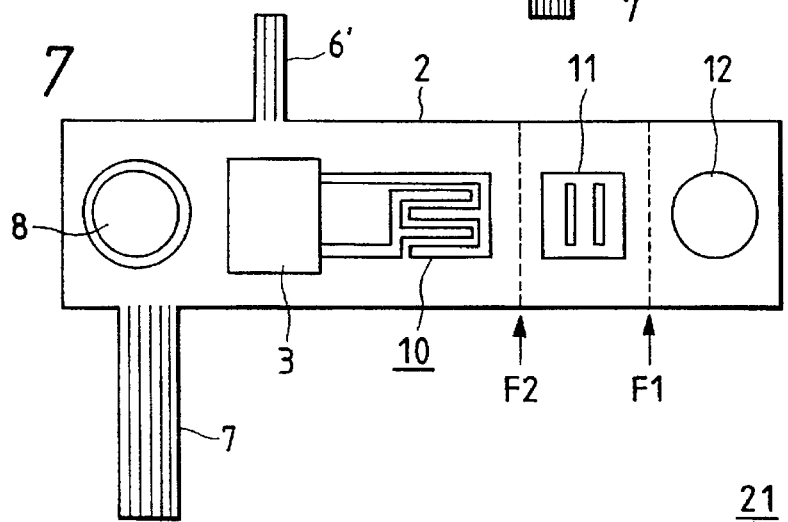
FIG. 7 is a view similar to FIG. 4 and corresponding to the embodiment of FIG. 6.
Figure 8:
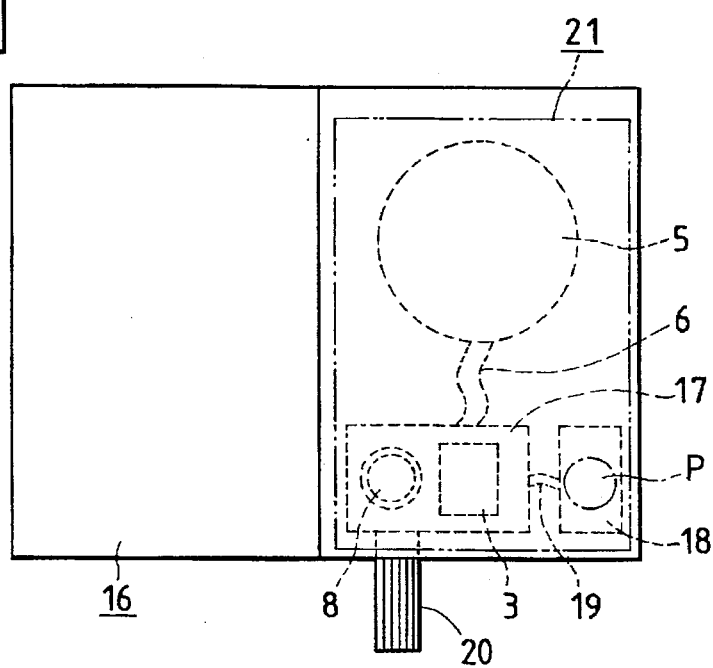
FIG. 8 is a view showing a prior art greeting card.

FIGS. 6 and 7 are similar to FIGS. 1 and 4 respectively, but show a simplified embodiment of the present invention.

The embodiment shown in FIGS. 6 and 7 differs from the first embodiment in that parts relating to the visible messages shown in the first embodiment are not provided. In the drawings, parts corresponding to the first embodiment are denoted by the same reference numerals. In particular, the greeting card 1'0 shown in FIG. 6 comprises, similar to the greeting card 1 of FIG. 1, a flexible substrate 2, a control circuit 3 for controlling the recording, storing and reproducing function of phonetic data, an actuating switch 4 provided on a substrate being integral to the substrate 2, a speaker 5 acting as phonetic signal reproducing means, connection wires 6 for connecting the speaker 5 with the substrate 2, a writing terminal 7 for writing desired phonetic message into the control circuit 3, and a dry battery 8 acting as a source of electric power.

The connection wires 6 in FIG. 6 may be substituted by a substrate portion 6' being integral to the substrate 2 as shown in FIG. 7.

It will be understood that any desired messages or drawings may be written or printed on the surface of the greeting card 1'.

Thus, according to the second embodiment shown in FIGS. 6 and 7, it is possible to obtain a greeting card having the construction simplified, thereby reducing the cost and improving the operational reliability.

As described heretofore, according to the invention, the control circuit for controlling desired recording, storage and reproduction of desired messages, the activating means for activating the reproduction of stored messages, and further, connection between the output means and the recording and storage circuit can be formed of a unitary circuit substrate, thus, it is possible to reduce the number of parts which enables to reduce the cost, and to improve the reliability by reducing the number of electrical connections.

Further, according to the invention, visual message can also be recorded, stored and reproduced, which improve usage of the greeting card.

What is claimed is:

1. A greeting card comprising:

a folded sheet card, means for supplying electric energy, means for displaying visual image data, means for producing audio messages, a control circuit mounted on a substrate for recording, storing and reproducing both visual images and audio messages, connecting means for electrically connecting the control circuit on the substrate with the visual image display means, connecting means for electrically connecting the control circuit on the substrate with the audio message producing means, writing terminals for writing desired visual images data and audio messages data on the control circuit from an external source and being connected electrically to the control circuit on the substrate, and activating means for activating and reproducing the visual images data and the audio messages data so that, when the activating means is activated by pressing a predetermined location on an exterior surface of the folded sheet card, the recorded and stored visual images data and audio messages data are reproduced such that the visual images are displayed and audio messages are generated.

2. The greeting card of claim 1, in which the circuit substrate is formed of a flexible substrate.

3. The greeting card according to claim 2, wherein the flexible substrate has a first portion on which is mounted the control circuit including a switch electrode of a switch and a second portion which includes a contact electrode of the switch.

4. The greeting card according to claim 3, wherein the flexible substrate includes a third portion located between the first and second portion.

5. The greeting card according to claim 4, wherein all of said portions are substantially parallel to each other.

6. The greeting card according to claim 5, wherein said third portion includes an opening adjacent to said switch electrode and said contact electrode so that said switch and contact electrodes can contact each other upon application of pressure.

7. The greeting card according to claim 2, further including means for displaying a visual image.

8. The greeting card according to claim 7, further including a first set of wires for connecting to the means for visually displaying an image, a second set of wires for connecting to speaker, said writing terminals and each of said set of wires being mounted on separate distinct portions of a single substrate.

9. The greeting card according to claim 1, in which the activating means is formed of a substrate which is a single continuous piece with the circuit substrate.

10. The greeting card according to claim 1, in which the writing terminals are formed on separate substrates which form with the circuit substrate a single continuous piece.

11. The greeting card according to claim 1, wherein at least the writing terminals for writing desired visual image data is folded.

12. The greeting card according to claim 11, wherein the control circuit includes an electrically erasable programmable read only memory.

13. A greeting card comprising:

a folded sheet, a button type dry battery, a visual image display device, a speaker, a control circuit mounted on a flexible circuit substrate for recording, storing and reproducing both visual images and audio messages data, a connecting substrate formed as a single continuous piece with the circuit substrate for connecting electrically the control circuit with the visual image display device and with the speaker, writing terminals for writing desired visual images data and audio messages data on the control circuit and being connected electrically to the control circuit on the substrate, and a switch for activating the reproduction of the visual images data and the phonetic messages data so that, when the switch is activated by pressing a predetermined location on the card, the recorded and stored visual images data and audio messages data are reproduced and the visual images are displayed and audio messages are generated.

14. The greeting card according to claim 13, wherein at least the writing terminals for writing desired visual image data is folded.

15. The greeting card according to claim 14, wherein the control circuit includes an electrically erasable programmable read only memory.

* * * * *